(12) United States Patent
Park

(10) Patent No.: US 9,232,496 B2
(45) Date of Patent: Jan. 5, 2016

(54) MOBILE TERMINAL AND METHOD OF CONTROLLING THE SAME

(71) Applicant: LG Electronics Inc, Seoul (KR)

(72) Inventor: Cheolhee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 14/309,185

(22) Filed: Jun. 19, 2014

(65) Prior Publication Data

US 2015/0038124 A1 Feb. 5, 2015

(30) Foreign Application Priority Data

Jul. 30, 2013 (KR) .................... 10-2013-0090501

(51) Int. Cl.

| H04M 3/42 | (2006.01) |
| H04W 64/00 | (2009.01) |
| H04W 4/16 | (2009.01) |
| H04W 4/02 | (2009.01) |

(52) U.S. Cl.
CPC .............. *H04W 64/006* (2013.01); *H04W 4/02* (2013.01); *H04W 4/16* (2013.01)

(58) Field of Classification Search
CPC ........ H04W 64/006; H04W 4/02; H04W 4/16

USPC ........ 455/414.1, 456.3, 415, 158.4, 566, 417; 379/127.06, 207.13, 245, 88.2, 93.03; 709/211.02, 204

See application file for complete search history.

(56) References Cited

U.S. PATENT DOCUMENTS

| 8,718,628 B2 * | 5/2014 | Goodman et al. ............ 455/417 |
| 8,725,130 B2 * | 5/2014 | White et al. .................. 455/415 |
| 2012/0064820 A1 * | 3/2012 | Bemmel ....................... 455/3.02 |
| 2012/0191777 A1 * | 7/2012 | Iwasaki et al. ................ 709/204 |
| 2015/0099545 A1 * | 4/2015 | Hyun .......................... 455/456.3 |

* cited by examiner

*Primary Examiner* — Amancio Gonzalez

(74) *Attorney, Agent, or Firm* — Birch, Stewart, Kolasch & Birch, LLP

(57) ABSTRACT

A mobile terminal including a wireless communication unit configured to perform wireless communication; and a controller configured to receive an incoming call from another terminal through the wireless communication unit, receive an input of a user action, when receiving the incoming call through the wireless communication unit, measure location information of the mobile terminal, if the input of the user action satisfies a preset condition, generate user context information using the measured location information of the mobile terminal and stored user schedule information, and transmit a phone rejection message including the user context information to the other terminal.

20 Claims, 21 Drawing Sheets

Fig. 11
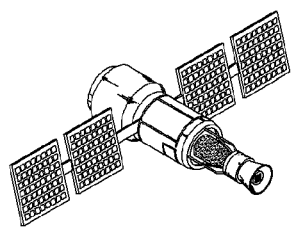
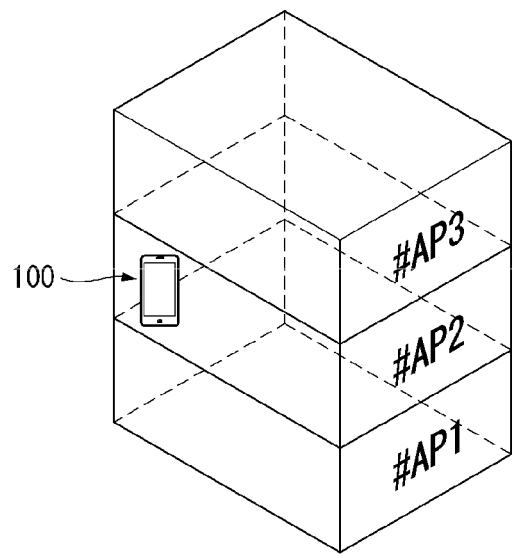
(a)                           (b)

Fig. 14
(a)
(b)

Fig. 19
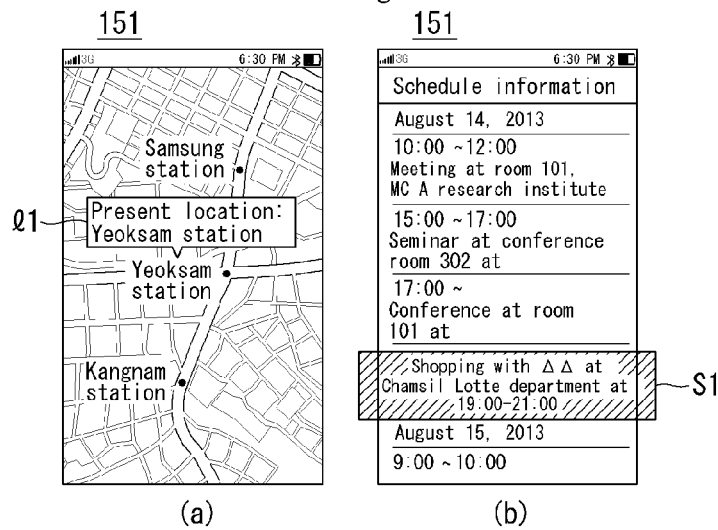
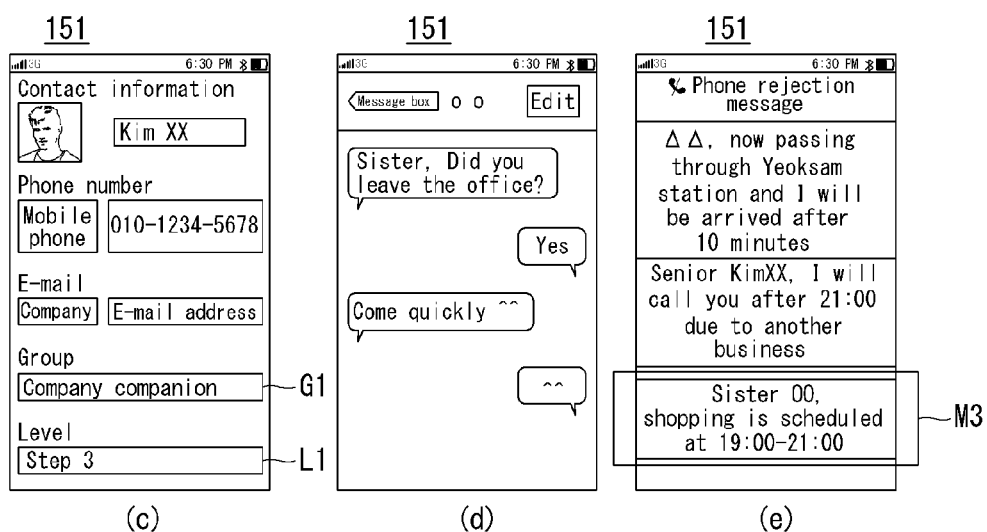

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2013-0090501, filed on 30 Jul., 2013, the contents of which are incorporated by reference herein in their entirety.

BACKGROUND OF THE INVENTION

1. Field of the Invention

The present invention relates to a mobile terminal and a method of controlling the same that provide user context information as a phone rejection message.

2. Discussion of the Related Art

Mobile terminals including a smart phone provide various multimedia services such as data communication, photographing, DMB viewing, moving picture reproduction, text message service, and schedule management as well as an audio dedicated communication function.

Further, when a user cannot receive a call, the mobile terminal can transmit a phone rejection text message to another party, but a limitation exists in accurately transmitting the user's state or situation. Particularly, the calling user has to keep calling the user and the user has to check phone reception notification in a difficult situation for communication.

SUMMARY OF THE INVENTION

One object of the present invention is to provide a mobile terminal and a method of controlling the same that provide a user's context information as a phone rejection message upon receiving a call using a user's schedule information stored at the terminal and location information of the mobile terminal measured upon receiving a call.

An embodiment of the present invention provides a mobile terminal including a wireless communication unit; and a controller configured to receive an input of a user action, when receiving a call through the wireless communication unit, measure location information of the terminal, if the input of the user action satisfies a preset condition, generate context information of a user using the measured location information of the terminal and stored schedule information of the user, and transmit a phone rejection message including the context information of the user.

The controller may be configured to determine that the input of the user action satisfies a preset condition, when receiving at least one input of receiving an input that terminates the call reception while receiving the call, receiving an input that releases notification of the call reception, receiving an input that inclines the terminal, receiving an input that shakes the terminal, receiving an input that overturns the terminal, and receiving an input that hovers an upper portion of the terminal.

The mobile terminal may further include a sensing unit including a posture detection sensor configured to detect a posture change of the terminal and a proximity sensor configured to detect whether the user approaches, wherein the controller may be configured to identify the input of the user action using an angle change or a motion change of the terminal detected through the posture detection sensor and a proximity pattern change detected through the proximity sensor.

The mobile terminal may further include a memory, wherein the controller may be configured to extract the schedule information of the user including a date and a time from at least one of a message stored at the terminal, a transmitted message, or a received message, an e-mail, a memo, and a schedule registered at an applied application, and to align and store the schedule information of the user in date and time order at the memory, and to periodically delete the schedule information of the user of a previous time point from the memory.

The controller may be configured to determine contents included in context information of the user according to the input of the user action.

The controller may be configured to determine a level of a sender using address book information and to determine contents included in the context information of the user according to the level of the sender.

The controller may be configured to set a level of contact information stored at the address book using group information of the address book or a communication history and to store the level of contact information as the address book information or to set a level input by the user as the address book information.

The controller may be configured to generate the user context information based on the stored schedule information of the user, if location information included in the schedule information of the user corresponds with the measured location information of the terminal and generates the context information of the user based on the measured location information of the terminal, if location information included in the schedule information of the user does not correspond with the measured location information of the terminal, when location information is included in the stored schedule information of the user.

The controller may be configured to couple the measured location information of the terminal, stored schedule information of the user, and location information of a sender and generates the context information of the user, when the location information of the sender is received.

The controller may be configured to control to display a pop-up window configured to determine whether the context information of the user and the phone rejection message are transmitted and to transmit the phone rejection message, when an input requesting transmission of the phone rejection message is received.

The controller may be configured to control to display at least one indicator that can edit the context information of the user on a basis of a type of contents and to overlap and display an editing screen of a corresponding content with the content, when an input of the at least one indicator is received.

The controller may be configured to generate the context information of the user including at least one of a sender's name, time information, location information, and a schedule content extracted from the stored schedule information of the user and the measured location information of the terminal in contents.

The controller may be configured to generate a sentence conversion rule using at least one of a pattern in which a user inputs a character, a sender, a communication history, and address book information and to adjust the generated context information of the user according to the sentence conversion rule.

The sentence conversion rule may include at least one of a conversion rule of a word, a selection rule of an postpositional word, a selection rule of a literary type, and a selection rule of formality, the controller may be configured to determine a priority of synonym selection and postpositional word selection using a pattern in which the user inputs a character, a sender, or a communication history and to determine a conversion rule of the word or a selection rule of an postpositional word according to the priority, and the controller may be configured to determine a priority of literary type selection and selection of a honorific title using the sender, the communication history, or the address book information, to determine a selection rule of the literary type according to the priority, and to determine a selection rule of formality according to whether selection of a honorific title.

The controller may be configured to set an intimacy level with the sender according to a frequency of the communication history and to readjust the adjusted context information of the user according to the intimacy level.

Another embodiment of the present invention provides a mobile terminal including: a wireless communication unit; and a controller configured to receive an input for terminating a call through the display unit, measure, if another party of the call satisfies a preset condition, location information of the terminal, generate context information of a user using the measured location information of the terminal and stored schedule information of the user, and transmit a phone rejection message including the context information of the user.

The controller may be configured to identify a level of another party of the call reception using address book information and to determine contents included in the context information of the user according to the level.

Another embodiment of the present invention provides a method of controlling a mobile terminal, the method including: receiving an input of a user action, when receiving a call; measuring, if the input of the user action satisfies a preset condition, location information of the terminal; generating the context information of the user using the measured location information of the terminal and stored schedule information of the user; and transmitting a phone rejection message including the context information of the user.

Another embodiment of the present invention provides a method of controlling a mobile terminal, the method including: receiving an input for terminating a call; measuring, if another party of the call satisfies a preset condition, location information of the terminal; generating context information of a user using the measured location information of the terminal and stored schedule information of the user; and transmitting a phone rejection message including the context information of the user.

The detailed matters of the embodiments will be included in the detailed description and the drawings.

A mobile terminal and a method of controlling the same according to an embodiment of the present invention have the following effects.

According to an embodiment of the present invention of the present invention, when receiving a call, by providing a receiver's context information as a phone rejection message, a sender can grasp the receiver's schedule and thus both the sender and the receiver can easily grasp a time that can perform communication without disturbing a schedule.

Further, according to an embodiment of the present invention of the present invention, because a content of a user's context information to be provided to a sender can be limited according to a preset level of the sender, personal information exposure can be minimized.

Further, according to an embodiment of the present invention of the present invention, by adjusting a user's context information included in a phone rejection message by various elements, user context information optimized according to another party to receive the phone rejection message can be generated.

Further, according to an embodiment of the present invention of the present invention, by providing a pop-up window that can edit generated context information of a user and select whether to transmit a phone rejection message, the user's personal information can be doubly protected.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 11 and 12 are diagrams illustrating a method of acquiring location information of a mobile terminal according to an embodiment of the present invention of the present invention.

FIG. 14 is a diagram illustrating a method of controlling a mobile terminal according to another party information of call reception related to an embodiment of the present invention.

FIGS. 16 to 20 are diagrams illustrating a method of controlling a mobile terminal by generating a phone rejection message according to an embodiment of the present invention of the present invention.

Figure 1:
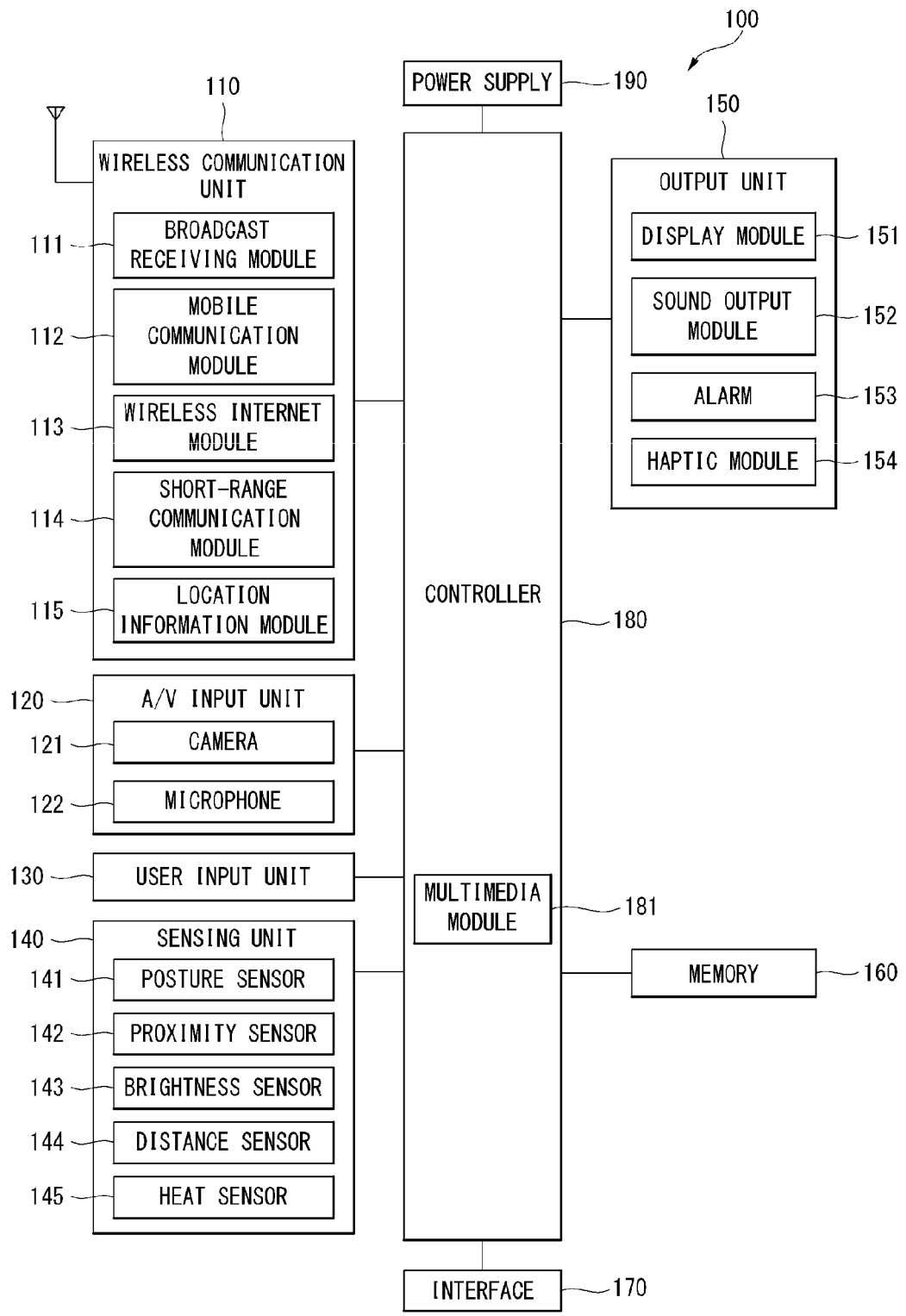
FIG. 1 is a block diagram of a mobile terminal according to an embodiment of the present invention.

DETAILED DESCRIPTION OF EMBODIMENTS
OF THE PRESENT INVENTION

The above and other aspects, features and advantages of the present invention will be more apparent from the following detailed description taken in conjunction with the accompanying drawings. As the invention allows for various changes and numerous embodiments, a particular embodiment will be illustrated in the drawings and described in detail in the written description. Like reference numerals refer to like elements throughout the specification. In describing the present invention, detailed descriptions of well-known functions or configurations will be omitted in order to not necessarily obscure the subject matter of the present invention. Numerals (e.g., first, second, etc.) used in the description of the present invention are only for distinguishing one element from another element.

A mobile terminal according to an embodiment of the present invention may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on. It should be apparent to those skilled in the art that a configuration according to an embodiment of the present invention disclosed in this specification should be applicable to fixed or stationary terminals, such as a digital TV or a desktop computer, except for applications disclosed to be specific only to a mobile terminal. A further description may be provided with regard to a mobile terminal, although such teachings may apply equally to other types of terminals.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a location information module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The location information module 115 may identify or otherwise obtain a location of the mobile terminal 100. The location information module 115 may be provided using global positioning system (GPS) components that cooperate with associated satellites, network components, and/or combinations thereof.

The location information module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The location information module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyrosensor.

The brightness detecting sensor 143 may detect a brightness of light around the mobile terminal 100 and then output the detected brightness to the controller 180. The distance detecting sensor 144 may include an ultrasonic sensor or the like. The distance detecting sensor 144 may measure a distance between the mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display module 151 (display 151), an audio or sound output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

The proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this instance, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be output to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be output via the display 151. The audio signal may be output via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be output in a manner of being synthesized together or may be sequentially output.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns output in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are input from the cradle by a user, to the mobile terminal 100. Various command signals input from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present invention explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
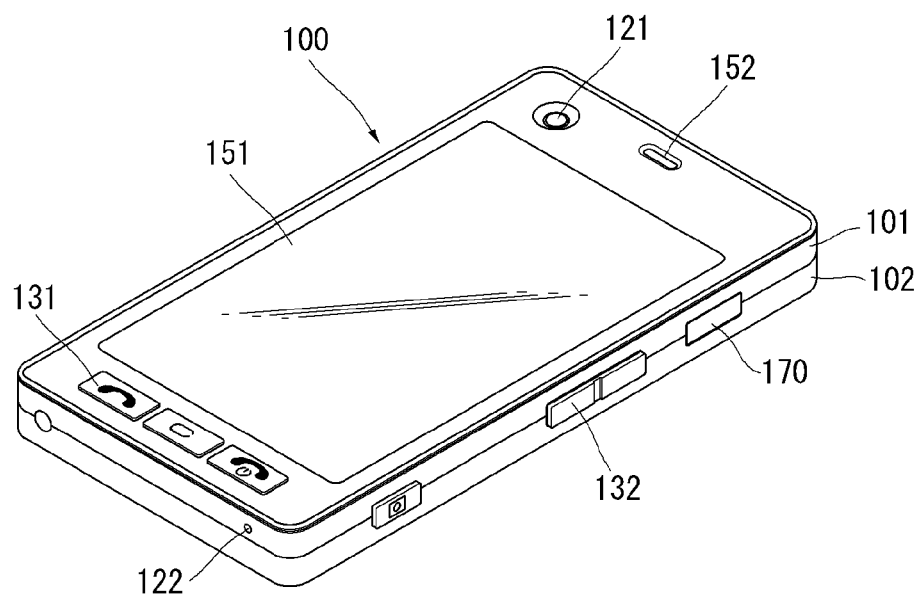
FIG. 2a is a front perspective view of the mobile terminal according to an embodiment of the present invention.

FIG. 2*a* is a front-view of a mobile terminal according to an example embodiment. Other embodiments, configurations and arrangements may also be provided. As shown in FIG. 2*a*, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content input by the first manipulating unit 131 or the second manipulating unit 132 may be diversely set. For example, a command such as start, end, scroll and/or the like may be input to the first manipulating unit 131. A command for a volume adjustment of sound output from the audio output unit 152, a command for a switching to a touch recognizing mode of the display 151 or the like may be input to the second manipulating unit 132.

Figure 2B:
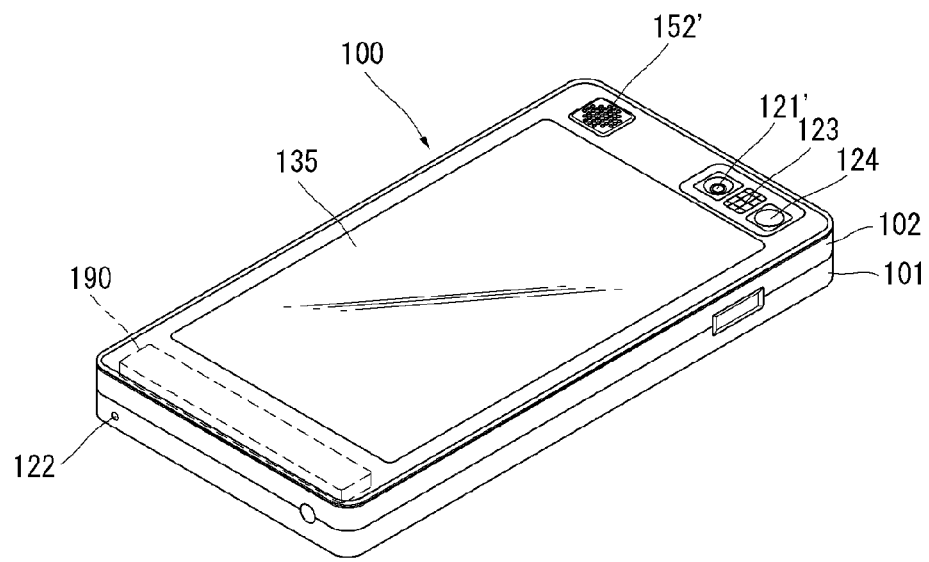
FIG. 2b is a rear perspective view of the mobile terminal according to an embodiment of the present invention.

FIG. 2*b* is a perspective diagram of a backside of the mobile terminal shown in FIG. 2*a*. Other embodiments, configurations and arrangements may also be provided. As shown in FIG. 2*b*, a camera 121' may be additionally provided on a backside of the terminal body, and more particularly on the rear case 102. The camera 121' may have a photographing direction that is substantially opposite to a photographing direction of the camera 121 (shown in FIG. 2*a*) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 124 may be additionally provided at the lateral side of the terminal body as well as an antenna for communication or the like. The antenna 124 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2*b* also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information output from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151. The proximity sensor 141 described with reference to FIG. 1 may now be explained in detail with reference to FIG. 3.

Figure 3:
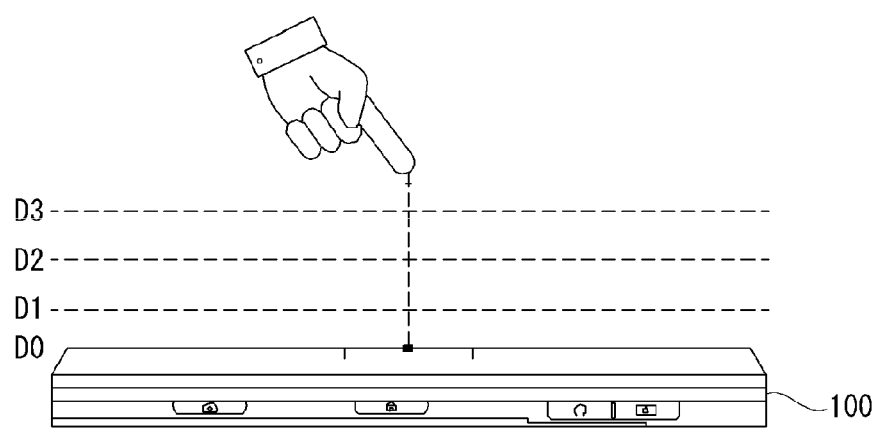
FIG. 3 is a diagram relating to a proximity depth of a proximity sensor.

FIG. 3 is a diagram relating to a proximity depth of a proximity sensor. Other embodiments, arrangements and configurations may also be used. As shown in FIG. 3, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth). FIG. 3 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

Figure 4:
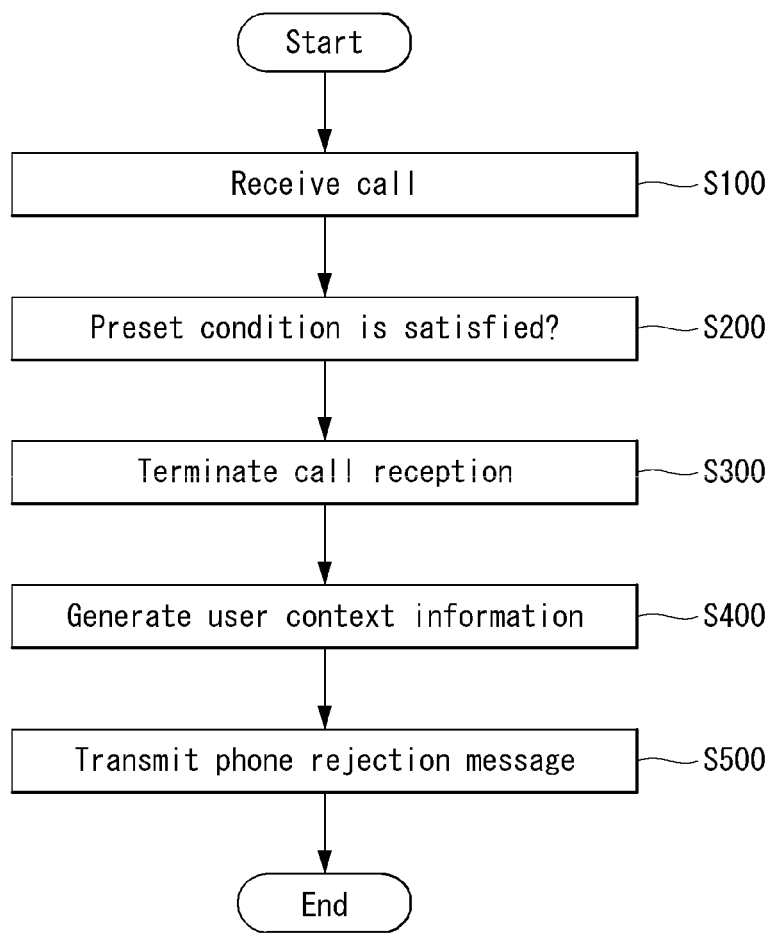
FIG. 4 is a flowchart illustrating a method of controlling a mobile terminal according to an embodiment of the present invention of the present invention.

Next, FIG. 4 is a flowchart illustrating a method of controlling a mobile terminal according to an embodiment of the present invention of the present invention. Referring to FIG. 4, when a call for audio dedicated communication or audiovisual communication is received through the wireless communication unit 110 (S100), the controller 180 determines whether the call satisfies a preset condition (S200).

If the call satisfies a preset condition, the controller 180 forcibly terminates call reception (S300), generates user context information (S400), and transmits a phone rejection message including the generated user context information to another party's terminal (S500).

If the call satisfies a preset condition, the controller 180 generates a phone rejection message satisfying user context information in real time and transmits the phone rejection message to another party. Therefore, another party may grasp a user's present situation through the transmitted phone rejection message and estimate a communication available time.

The preset condition may be divided into a condition related to a user action and a condition related to another party of call reception.

In general, because it is against a user's privacy to transmit the user's context information to all other parties, the controller 180 may determine whether to transmit a phone rejection message including the user's context information according to a preset condition and whether to limit a portion of context information of the user.

Specifically, when the user does not want to notify specific context information, the controller 180 may not transmit a phone rejection message or not to transmit a phone rejection message including the user's context information. Further, the controller 180 may determine whether to transmit a phone rejection message including the user's context information according to intimacy of another party that requests call reception and whether to limit specific information of the user's context information.

The controller 180 may measure location information of the terminal and generate the user's context information using the measured location information of the terminal and the user's schedule information stored at the terminal.

For example, the controller 180 may receive location information (GPS information and Wi-Fi information) of the terminal and determine a present location of the terminal as 'second floor of MC-A research institute of LG Electronics'. The controller 180 determines 'Patent meeting at conference room 302 at 3 PM-4 PM' stored at a schedule application of the terminal as schedule information.

The controller 180 compares location information of the terminal and the user's schedule information, and if location information of the terminal corresponds with the user's schedule information, the controller 180 generate the user's context information by coupling the location information of the terminal and the user's schedule information. In addition, if location information of the terminal does not correspond with the user's schedule information, the controller 180 generates the user's context information based on location information in consideration of the relationship of both the location information of the terminal and the user's schedule information.

Figure 5:
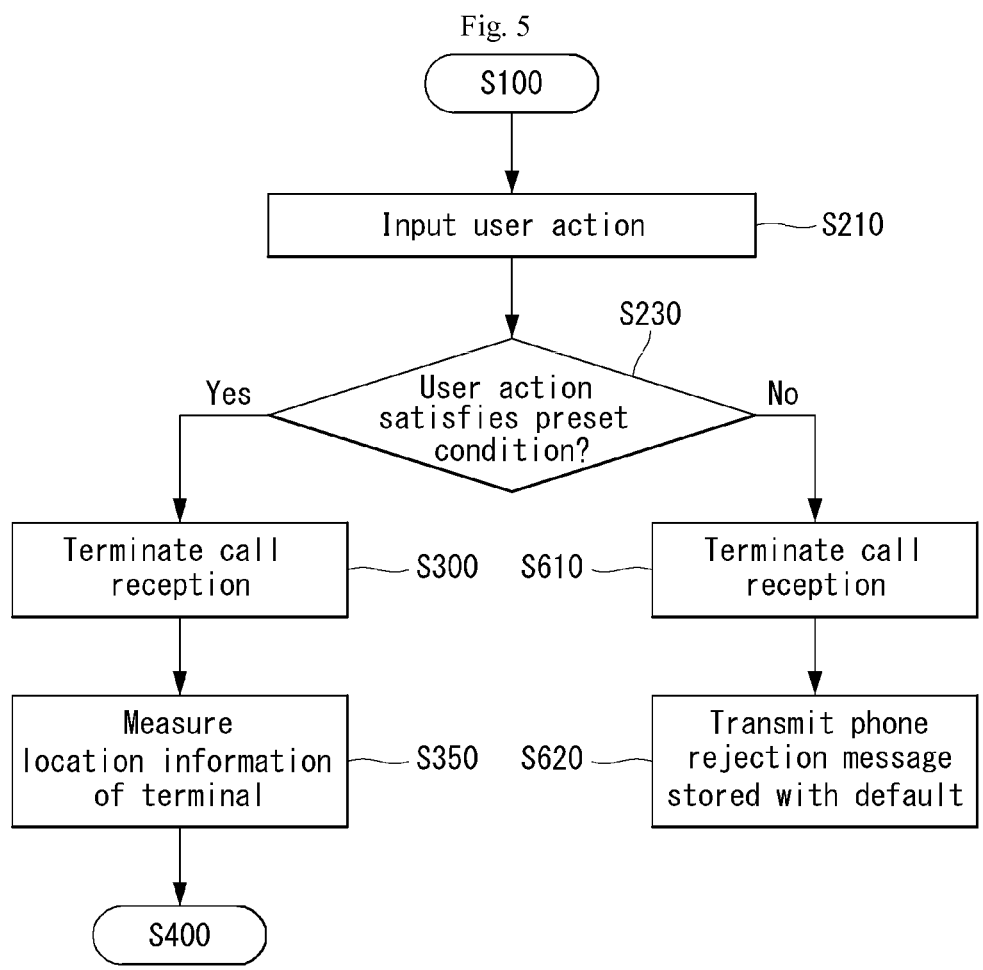
FIG. 5 is a flowchart illustrating a method of controlling a mobile terminal according to a user action related to an embodiment of the present invention.
Figure 6:
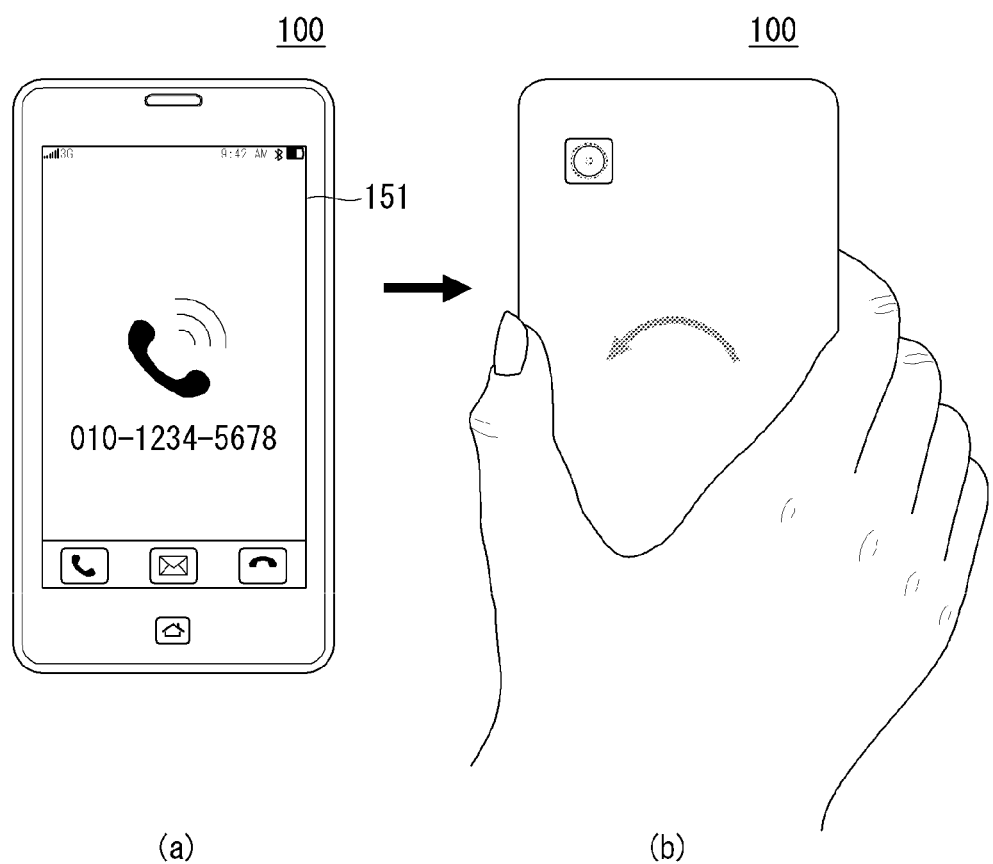
FIGS. 6 to 9 are diagrams illustrating a method of controlling a mobile terminal according to a user action related to an embodiment of the present invention.

Next, FIG. 5 is a flowchart illustrating a method of controlling a mobile terminal according to a user action related to an embodiment of the present invention, and FIGS. 6 to 9 are diagrams illustrating a method of controlling a mobile terminal according to a user action related to an embodiment of the present invention.

Referring to FIG. 5, when a call is received (S100), the controller 180 receives a user action (S210) and determines whether the input user action satisfies a preset condition (S230).

When at least one input of receiving an input that terminates call reception with a soft key button or a manipulation key while receiving a call, receiving an input that releases notification of call reception, receiving an input that inclines a terminal, receiving an input that shakes a terminal, receiving an input that overturns a terminal, and receiving an input that hovers an upper portion of a terminal is received, the controller 180 may determine that the user action satisfies a preset condition. The input may include various inputs in which the controller 180 may determine as an input by the user action in addition to inputs by the illustrated user action.

Specifically, the controller 180 may determine whether an input by the user action satisfies a preset condition using a moving angle change, a moving direction change, a rotation angle change, and a proximity pattern change of a terminal detected through the sensing unit 140.

If an input by the user action satisfies a preset condition (Yes in S230), the controller 180 terminates call reception (S300) and measures location information of the terminal (S350). The controller 180 may determine whether to forcibly terminate call reception according to an input type according to the user action and whether to forcibly terminate call reception after awaiting that call reception is complete.

The controller 180 generates user context information using measured present location information of the terminal after call reception is terminated (S400). Specifically, the controller 180 compares present location information of the terminal and schedule information stored at the terminal and generates various user context information according to a comparison result. A method of generating user context information will be described later.

If the user action does not satisfy a preset condition (No in S230), when call reception is complete, the controller 180 automatically terminates call reception (S610). When call reception is automatically terminated, the controller 180 does not transmit a phone rejection message to call reception another party or may transmit a phone rejection message stored with a default (S620).

Referring to FIGS. 6 to 9, the controller 180 determines whether the user action corresponds to which input using a signal detected through the sensing unit 140 while receiving a call. In more detail, referring to FIG. 6, if the mobile terminal 100 maintains an equilibrium state and maintains again an equilibrium state after being rotating by 180° while receiving a call, the controller 180 determines that an input that turns over the mobile terminal 100 is received.

The controller 180 receives and analyzes a detected rotation angle and rotation direction through the posture detection sensor 141, thereby determining an equilibrium state and a posture change of the mobile terminal 100. Further, the controller 180 determines the user action as an input that turns over the mobile terminal 100 using whether a detected user contacts with the mobile terminal 100 through the proximity sensor 142.

Figure 7:
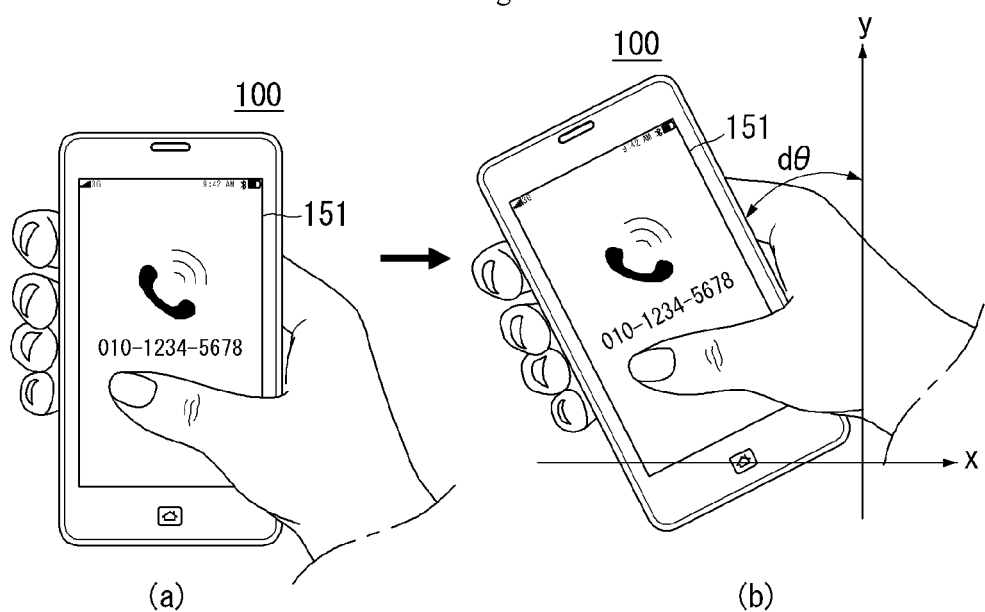

Referring to FIG. 7, if a posture change of the mobile terminal 100 is included in an angle of a preset range while receiving a call, the controller 180 determines that an input that inclines the mobile terminal 100 is received. The controller 180 receives and analyzes a detected rotation angle and rotation direction through the posture detection sensor 141, thereby determining a posture change (inclined angle) of the mobile terminal 100.

The controller 180 determines the user action as an input that inclines the mobile terminal 100 using whether a detected user contacts with the mobile terminal 100 through the proximity sensor 142.

When the controller 180 receives an input that inclines the mobile terminal 100, in order to prevent an error that processes an unintended action of the user as an input that satisfies a preset condition, the controller 180 may additionally determine whether the input satisfies another condition.

Specifically, only when receiving an input that inclines the mobile terminal after receiving a specific input, the controller 180 determines that the input satisfies a preset condition. Here, a specific input may be one of a call reception termination input, a touch or continuous touch input of the touch screen 151, and an input to a specific manipulation key. Further, only when the mobile terminal returns to a previous posture within a preset time after receiving an input that inclines the mobile terminal, the controller 180 determines that the input satisfies a preset condition.

Figure 8:
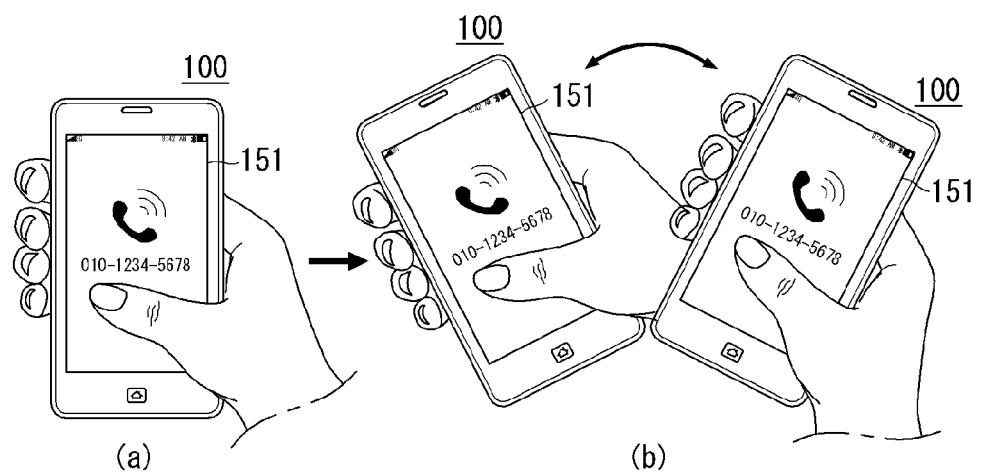

Referring to FIG. 8, if the number of times of a posture change of the mobile terminal 100 is equal to or larger than a reference value while receiving a call, the controller 180 determines that an input that shakes the mobile terminal 100 is received. The controller 180 receives and analyzes a rotation angle and a rotation direction detected through the posture detection sensor 141, thereby determining a posture change (inclined angle and direction) of the mobile terminal 100.

When the mobile terminal 100 is returned to an original posture after a posture of the mobile terminal 100 is changed based on a posture of the mobile terminal 100 of a call reception start time point (hereinafter, referred to as 'when receiving a call'), the controller 180 may count this as one time posture change.

For example, as shown in FIG. 8, when a call is received, the controller 180 determines that a posture of the mobile terminal 100 is vertical to the ground (hereinafter, referred to as 'a Y-axis'), and when the mobile terminal 100 rotates again clockwise after rotating by a predetermined angle counterclockwise based on an y-axis for a time until call reception is terminated and is positioned at the y-axis, the controller 180 may count the number of times of a posture change as two times.

Although the embodiment considers only a two-dimensional motion of the mobile terminal 100, when shaking the mobile terminal 100, the controller 180 may count the number of times of a posture change in consideration of a three-dimensional motion. The controller 180 may determine the user action as an input that shakes the mobile terminal 100 using whether the detected user contacts with the mobile terminal 100 through the proximity sensor 142.

Even when the controller 180 receives an input that shakes the mobile terminal 100, in order to prevent an error that processes an unintended user action as an input that satisfies a preset condition, the controller 180 may additionally determine whether the input satisfies another condition. That is, the controller 180 determines an effective input.

Specifically, the controller 180 cannot determine a state of the mobile terminal 100 before call reception as a shaking input, but determine an input of only when receiving an input that shakes the mobile terminal 100 after call reception as an effective input. Only when receiving an input that shakes the mobile terminal after receiving a specific input, the controller 180 may determine that the input satisfies a preset condition.

Here, a specific input may be one of a call reception termination input, a touch or continuous touch input of the touch screen 151, and an input to a specific manipulation key. Further, if a posture change of the mobile terminal 100 repeats a similar trajectory, the controller 180 may determine that the posture change satisfies a preset condition. For example, when posture changes of ten times occur while receiving a call, if posture changes of ten times form the same plane trajectory based on a location of the mobile terminal 100 upon receiving a call or if an angle between planes in which each posture change trajectory is positioned exists within an error angle, the controller 180 may determine that the posture change satisfies a preset condition.

Figure 9:
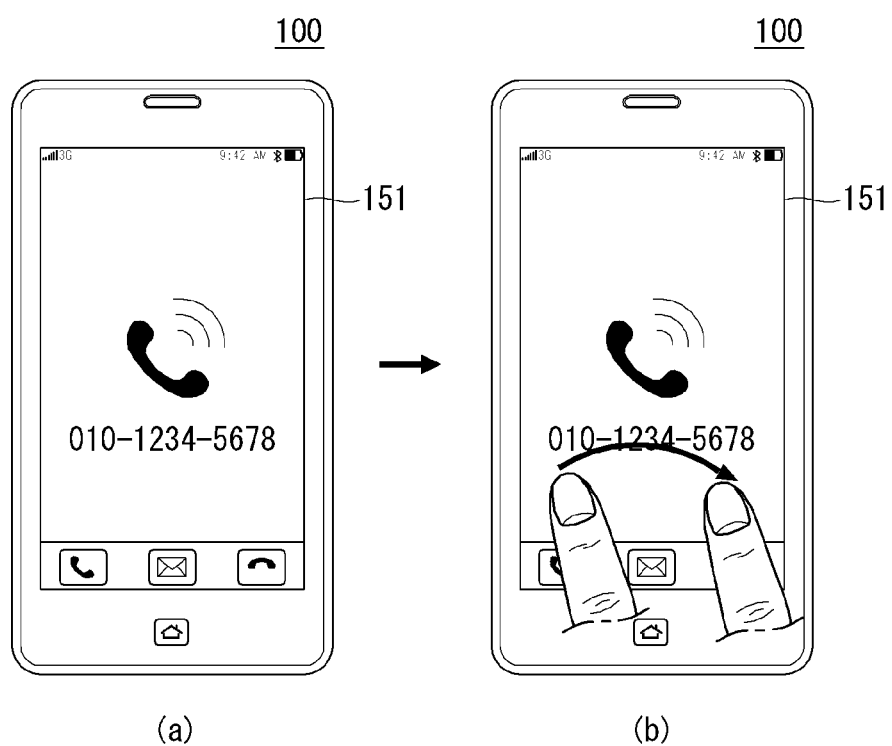

Referring to FIG. 9, when a capacitance change detected through the touch screen 151 while receiving a call is included in a preset range, the controller 180 may determine that an input that hovers an upper portion of the mobile terminal 100 is received. Specifically, when it is detected that a user or an object approaches through the proximity sensor 142 disposed at a lower portion of the touch screen 151 or a peripheral area (bezel area) of the touch screen 151, the controller 180 may analyze a detected signal.

The controller 180 analyzes a signal detected in the proximity sensor 142, and when a user body or an object draws a predetermined trajectory in an upper portion of the touch screen 151, the controller 180 may determine that an input that hovers an upper portion of the mobile terminal 100 is received.

Figure 10:
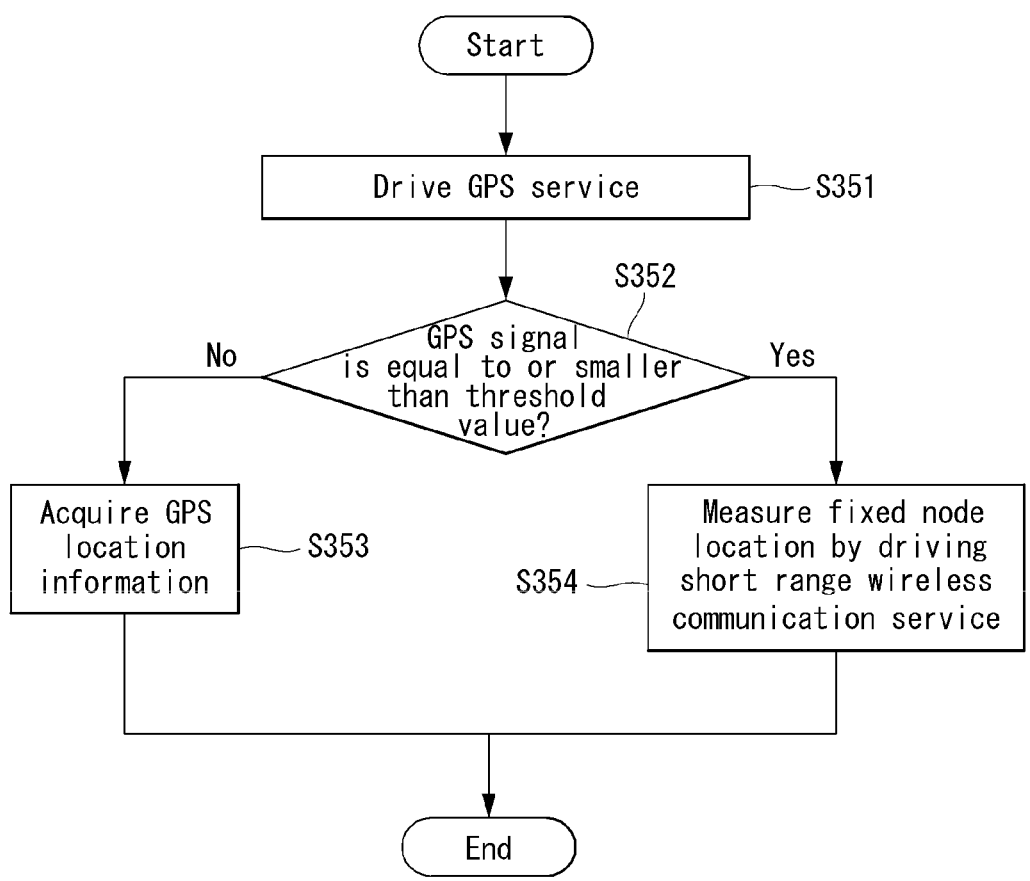
FIG. 10 is a flowchart illustrating a method of acquiring location information of a mobile terminal according to an embodiment of the present invention of the present invention.
Figure 12:
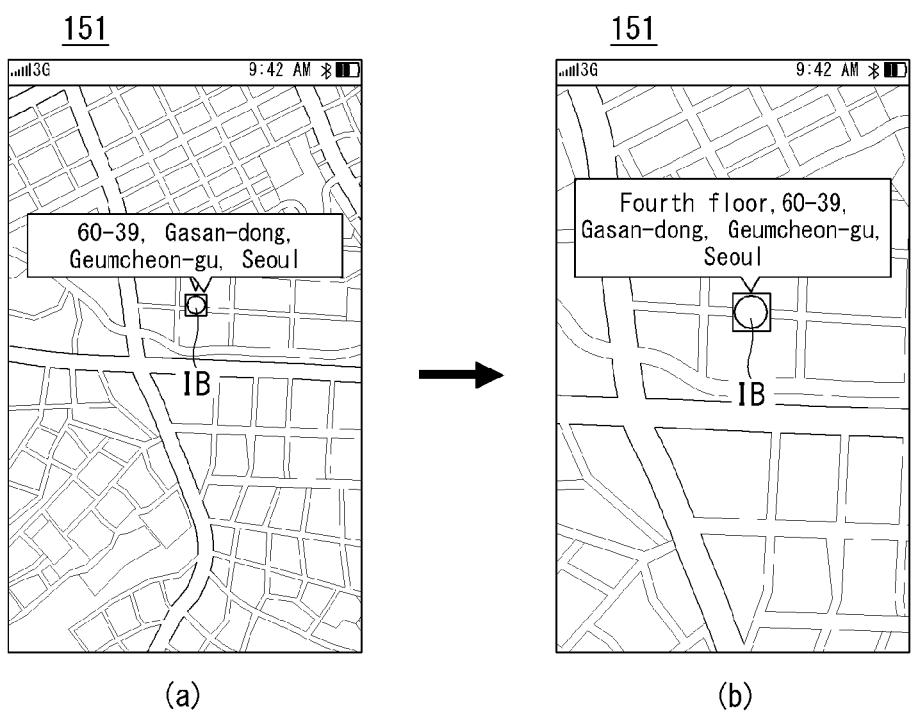

Next, FIG. 10 is a flowchart illustrating a method of acquiring location information of a mobile terminal according to an embodiment of the present invention of the present invention, and FIGS. 11 and 12 are diagrams illustrating a method of acquiring location information of a mobile terminal according to an embodiment of the present invention of the present invention.

If a preset condition is satisfied, in order to generate a phone rejection message including user context information, when a call is terminated, the controller 180 may measure location information of the mobile terminal. Referring to FIG. 10, the controller 180 calculates a global position system (GPS) signal that drives a GPS service through the location information module 115 (S351).

The location information module 115 calculates information about a distance in which a point is separated from at least three satellites and information about a time in which distance information is measured and calculates three-dimensional location information according to a latitude, a longitude, and an altitude about the point at one time by applying trigonometry to the calculated distance information.

The location information module 115 may use a method of calculating location and time information using three satellites and adjusting an error of the calculated location and time information using another one satellite. The location information module 115 continues to calculate a present location in real time and may calculate speed information using the calculated present location.

The controller 180 compares a GPS signal and a threshold value (S352), and if a GPS signal exceeds a threshold value (No in S352), the controller 180 acquires GPS location information (S353), and if a GPS signal is equal to or smaller than a threshold value (Yes in S352), the controller 180 measures a fixed node location by driving a short range wireless communication service (S354).

That is, as the mobile terminal moves into a building, if a GPS signal is equal to or smaller than a threshold value, the controller 180 cannot receive an accurate signal from a satellite and thus measures a fixed node location by driving a short range wireless communication service, thereby measuring accurate location information of the mobile terminal without using a satellite signal.

Referring to FIG. 11(a), when the mobile terminal 100 is positioned at the outside of a building or moves at the outside of a building, the controller 180 calculates location information and time information of the mobile terminal 100 using a satellite. However, when the mobile terminal 100 enters within a building, strength of a receiving signal from a satellite is weak and thus when calculating location information of the mobile terminal 100, an error may occur.

Therefore, if a GPS signal is equal to or smaller than a threshold value, the controller 180 does not calculate location information using a satellite and measures a connected fixed node location by driving a short range wireless communication service, thereby using a fixed node location as location information of the mobile terminal 100.

Referring to FIG. 11(b), when the mobile terminal 100 drives a short range wireless communication service, the mobile terminal 100 may connect to #access point (AP) 2 installed at a second floor within a building and receive location information of #AP 2.

In this instance, the controller 180 may acquire location information of a connected fixed node as location information of the mobile terminal 100.

Referring to FIG. 12(a), the controller 180 may acquire location information "60-39, Gasan-dong, Geumcheon-gu, Seoul" of the mobile terminal of a time point in which call reception is terminated using a GPS signal received from a satellite. Referring to FIG. 12(b), when the mobile terminal moves to the inside of a building at a time point in which call reception is terminated, i.e., when a GPS signal is equal to or smaller than a threshold value, the controller 180 may acquire "fourth floor, 60-39, Gasan-dong, Geumcheon-gu, Seoul", which is fixed node location information by driving a short range wireless communication service as location information of the mobile terminal.

Figure 13:
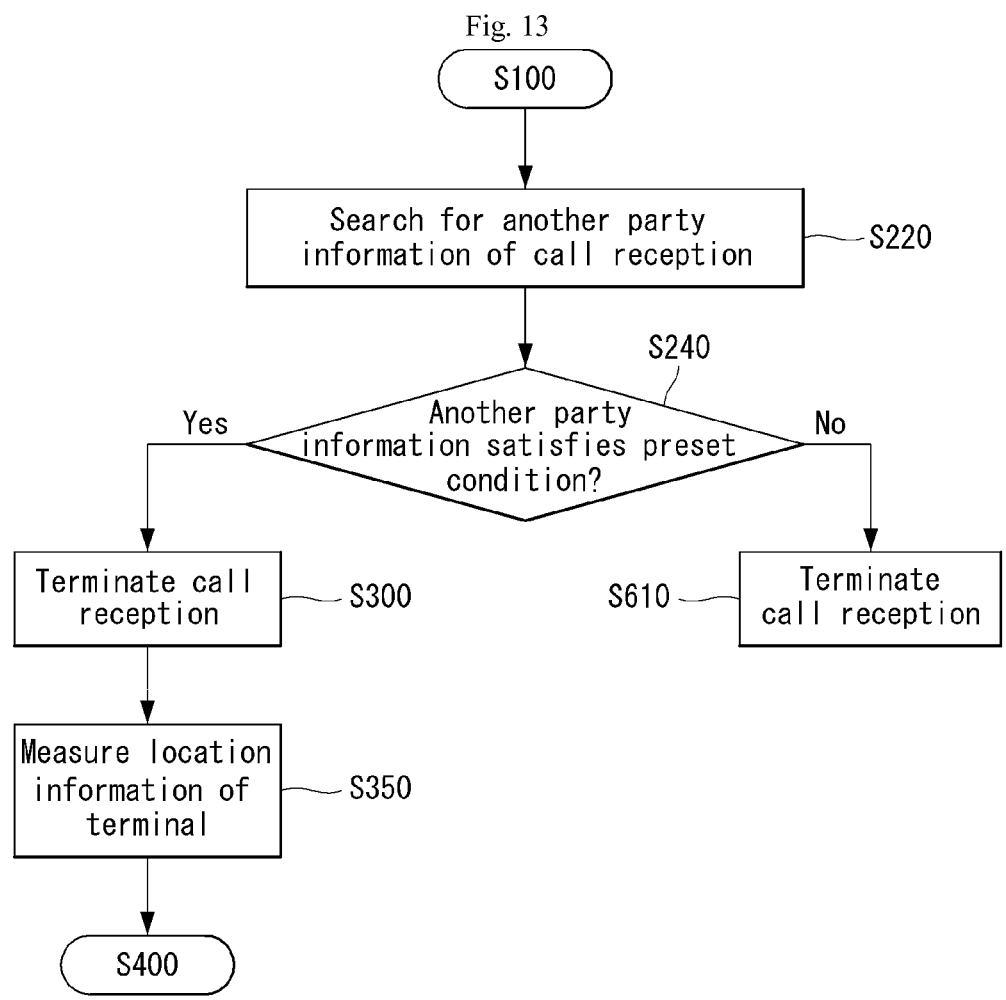
FIG. 13 is a flowchart illustrating a method of controlling a mobile terminal according to another party information of call reception related to an embodiment of the present invention.

Next, FIG. 13 is a flowchart illustrating a method of controlling a mobile terminal according to another party information of call reception related to an embodiment of the present invention, and FIG. 14 is a diagram illustrating the method in FIG. 13 related to an embodiment of the present invention.

Referring to FIG. 13, the controller 180 searches for another party information of call reception (S220) and determines whether another party information satisfies a preset condition (S240). The controller 180 determines whether to generate a phone rejection message including user context information according to another party of call reception, thereby protecting the user's privacy.

For example, when another party of call reception is not stored at an address book, the controller 180 may set not to transmit a phone rejection message or may set to transmit only a phone rejection message stored with a default. The controller 180 may determine another party information using information stored at the address book, a text message content, a phone or message transmitting and receiving history, and information stored at the user's mobile terminal.

In this instance, another party information may be set to several levels based on whether to generate a phone rejection message including user context information and limited particulars of user context information included in a phone rejection message. If another party information satisfies a preset condition (Yes in S240), the controller 180 terminates call reception (S300), measures location information of the terminal (S350) and generates the user's context information (S400). In this instance, call reception termination (S300) may include forced termination corresponding to the user's call reception termination input and automatic termination after call reception is complete.

If another party information does not satisfy a preset condition (No in S240), the controller 180 terminates call reception (S610). In this instance, call reception termination (S610) means automatic termination after call reception is complete.

If call reception is terminated at step S610, when phone rejection message transmission stored with a default is set, the controller 180 may transmit the phone rejection message stored with a default to another party. The phone rejection message stored with a default is a uniform message that does not include user context information like 'I am in a meeting', 'I will call you later'.

Referring to FIG. 14, the controller 180 may set another party's level using another party's information stored at the address book including honorific title information, a group, a name, a text message content, a phone or message transmitting and receiving history, and information stored at the user's mobile terminal.

The controller 180 may store a preset level of another party as address book information. Here, another party's level may be set based on whether to generate a phone rejection message including user context information and limited particulars of user context information included in a phone rejection message.

When a call is received, the controller 180 searches for another party information at the address book and determines whether to transmit phone rejection message including user context information according to a preset level of another party of call reception. A higher level may mean to transmit context information and a lower level may mean not to transmit context information.

Figure 15:
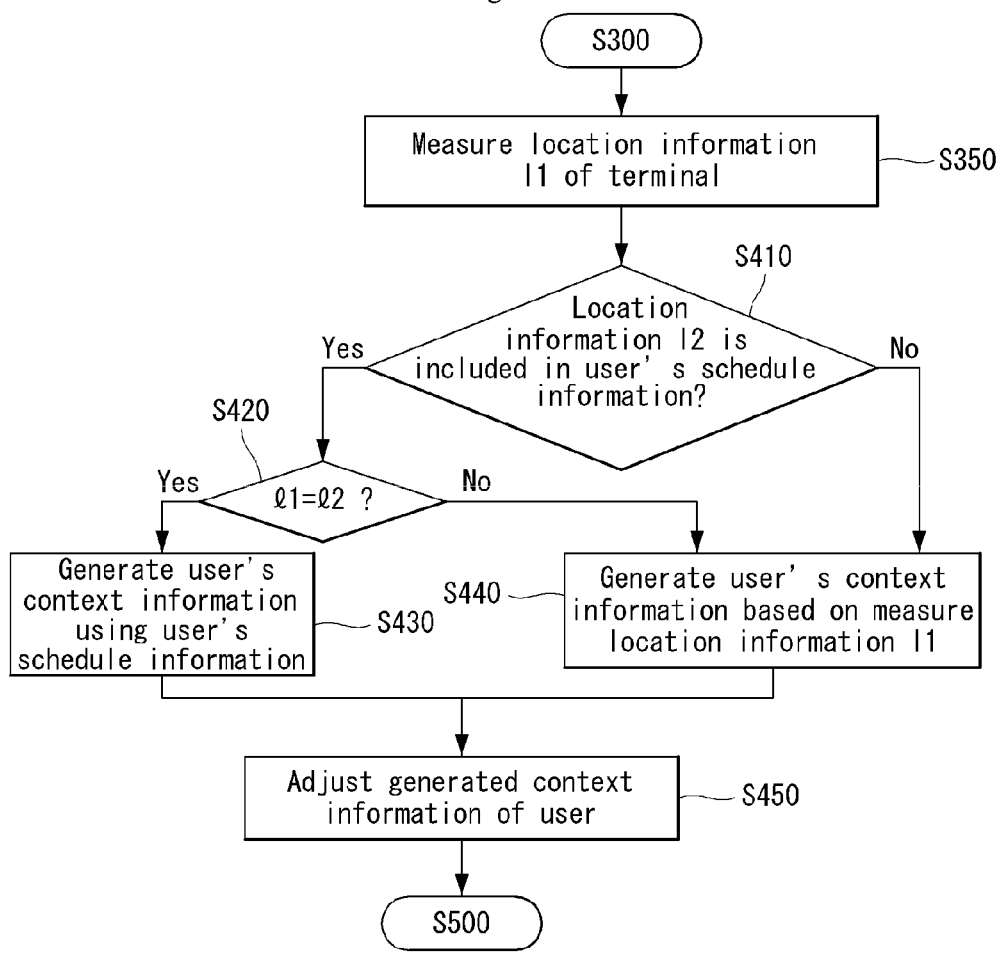
FIG. 15 is a flowchart illustrating a method of controlling a mobile terminal by generating a phone rejection message according to an embodiment of the present invention of the present invention.

FIG. 15 is a flowchart illustrating a method of controlling a mobile terminal by generating a phone rejection message according to an embodiment of the present invention of the present invention, and FIGS. 16 to 20 are diagrams illustrating the method in FIG. 15.

Referring to FIG. 15, the controller 180 measures location information 11 of the terminal (S350) and determines whether location information 12 is included in a user's schedule information (S410). Here, a method of measuring location information 11 of the terminal has been described in detail in the foregoing description and thus a detailed description thereof will be omitted.

The user's schedule information means information including date or time information, and the controller 180 may extract the user's schedule information from information stored at the terminal or transmitted or received information. Specifically, the controller 180 may extract information including date or time information from at least one of schedules registered at a message, an e-mail, a memo, and an applied application as the user's schedule information.

The controller 180 stores the extracted schedule information of the user in time order at the memory 160 and updates periodically elapsed schedule information of the user by deleting and supplementing. If location information 12 is included in the user's schedule information (Yes in S410), the controller 180 compares whether location information 11 of the terminal acquired when call reception is terminated is the same as the location information 12 of the terminal before and after a call reception time point (preset range) among the user's schedule information stored at the memory 160 (S420).

If location information 11 of the terminal acquired when call reception is terminated is the same as the stored location information 12, the controller 180 generates the user's context information using the user's schedule information (S430).

That is, the controller 180 generates user context information by processing necessary data of the user's schedule information stored at the terminal.

When location information 11 of the terminal acquired when call reception is terminated is not the same as the stored location information 12 and when the location information 12 is not included in the user's schedule information (No in S410), the controller 180 generates the user's context information based on the location information 11 of the terminal acquired at a call end time point (S440).

In this instance, because the user's context is in a state that does not perform the stored schedule information of the user, the controller 180 generates context information of an actual user based on the user's location information acquired at a call end time point.

The location information 11 of a call reception termination time point does not correspond with the location information 12 included in the user's schedule information, but if location information exists within a preset reference range, the controller 180 generates the user's context information in consideration of this. When a location of a call end time point and a stored location are in a distance difference that may arrive within a specific time using walking and a traffic means, the controller 180 may determine the distance difference as a distance difference within a reference range.

In this instance, a specific time may be determined in consideration of schedule information of the user after a call reception termination time point. For example, the controller 180 may determine whether call reception another party is a party who performs together a schedule later and may use a time necessary for performing a schedule later as an item to consider in the user's schedule information.

The controller 180 may generate the user's context information using another party information (preset level) of call reception, an input action pattern of the user, and schedule information and location information of the user. The controller 180 may generate the user's context information including at least one of time information, location information, a schedule content, and measured location information of the terminal extracted from the stored schedule information of the user in a content.

When the controller 180 receives a sender's location information, the controller 180 may generate the user's context information by coupling measured location information of the terminal and stored schedule information of the user and the sender's location information. For example, in the user's schedule information before and after a call reception termination time, a sender is stored as a cooperation schedule performer, and when the user's present location is not a location included in schedule information, but is a distance taking about 5 minutes on foot from a location included in schedule information, and when a location received from a sender and a location included in schedule information are a distance taking about 5 minutes on foot, the controller 180 may generate user context information including a content "I will be arrived at a schedule location at a time point similar to that of a sender".

That is, the controller 180 may generate various user context information according to a parameter considered upon generating user context information such as a present location of the user at a call reception termination time point, stored schedule information (schedule content, another party to perform schedule, time, etc.), another party information of call reception, another party location information of call reception, and the user action pattern input to the terminal upon receiving a call.

The controller 180 adjusts generated context information of the user (S450). The controller 180 may generate a sentence conversion rule using at least one of a pattern in which the user inputs a character, a sender, and communication and address book information and may adjust the user's context information generated according to a sentence conversion rule.

The sentence conversion rule may include at least one of a conversion rule of a word, a selection rule of a postpositional word, and a selection rule of a literary type, and a selection rule of formality. The conversion rules are a rule that changes to one of forms stored at a database based on a use frequency and a past history. For example, the conversion rules are a condition that converts a specific word to another word according to a priority of stored synonyms, that converts an absolute time to a relative time, or that converts an absolute location to a relative location.

Specifically, the controller 180 may give a priority when selecting a synonym and selecting a postpositional word according to the user's character input pattern, a sender, or a communication history and may convert a word and a postpositional word according to the priority.

The controller 180 determines a priority of literary style selection and selection of a honorific title using a sender, a communication history, or address book information, determines a selection rule of a literary type according to the priority, and determines a selection rule of formality according to whether selection of a honorific title.

Figure 16:
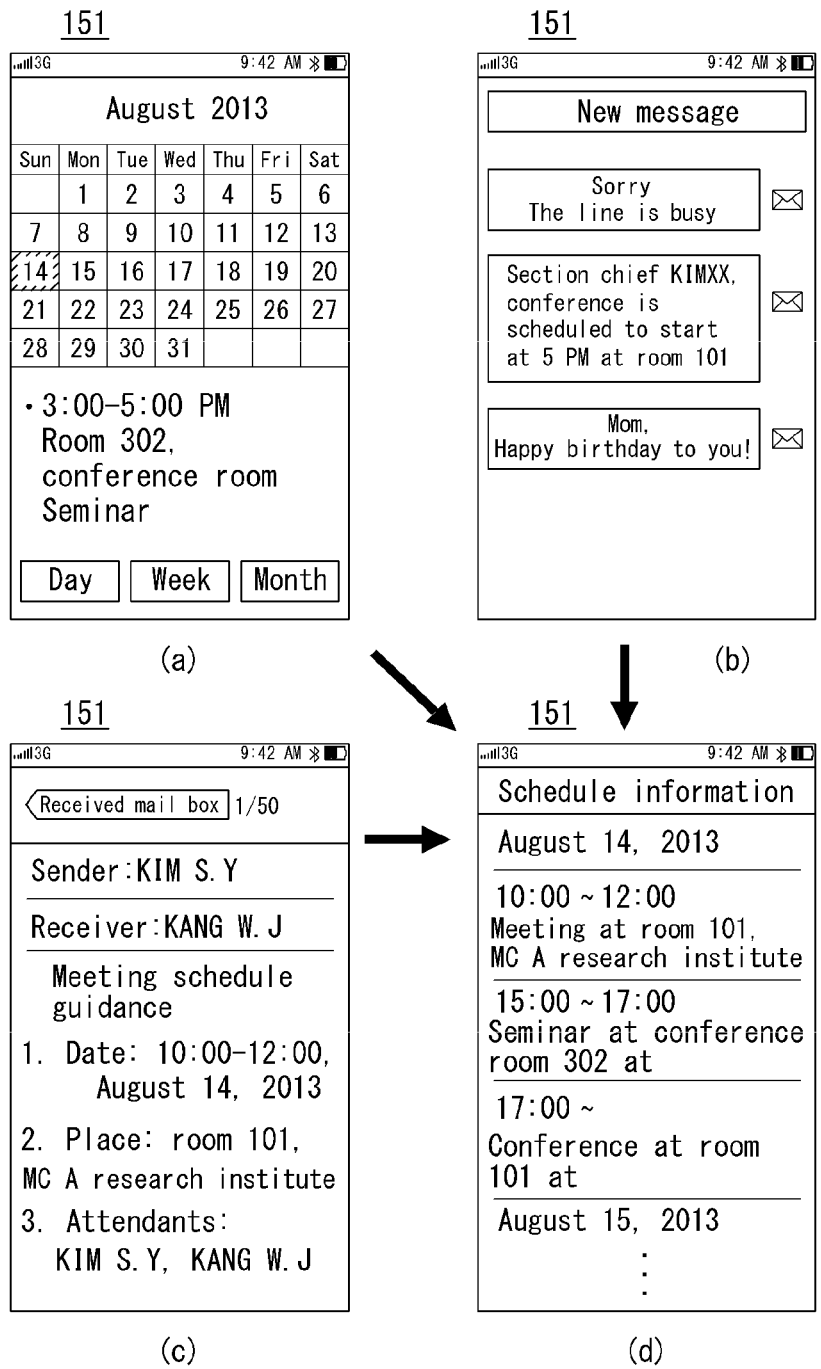

A method of generating a phone rejection message including user context information will be described with reference to FIGS. 16 to 20. Referring to FIG. 16, the controller 180 extracts information including date or time information from schedule information registered at a schedule application, a transmitted and received message, and an e-mail and stores the information as schedule information of the user at the memory 160.

The controller 180 may extract each of 'Seminar at conference room 302 at 3:00-5:00 PM, Aug. 14, 2013 from a schedule application, 'Section chief KIMXX, a conference is scheduled to start at 5 PM at room 101' from a message, and 'Meeting schedule guidance, 1. Date: 10:00-12:00, Aug. 14, 2013, 2. Place: room 101, MC A research institute, 3. Attendants: KIM S. Y, KANG W. J' from an e-mail, as shown in FIGS. 16(*a*)-(*c*).

The controller 180 may process the extracted information using date, time, and location information stored at the terminal. For example, the controller 180 may process 'section chief KIMXX, a conference is scheduled to start at room 101 at 5 PM', which is information extracted from the message to 'section chief KIMXX, a conference is scheduled to start at room 101 at 5 PM, Aug. 14, 2013' using a message transmitting time. Further, the controller 180 may specifically process location information using location information measured in the mobile terminal.

Referring to FIG. 16(*d*), the controller 180 may store user schedule information of Aug. 14, 2013 as "meeting at room 101, MC A research institute at 10:00-12:00", "seminar at conference room 302 at 15:00-17:00", and Conference at room 101 at 17:00~". That is, the controller 180 may process extracted information, generate user schedule information in time, location, and schedule content order, and store the user schedule information at the memory 160.

Figure 17:
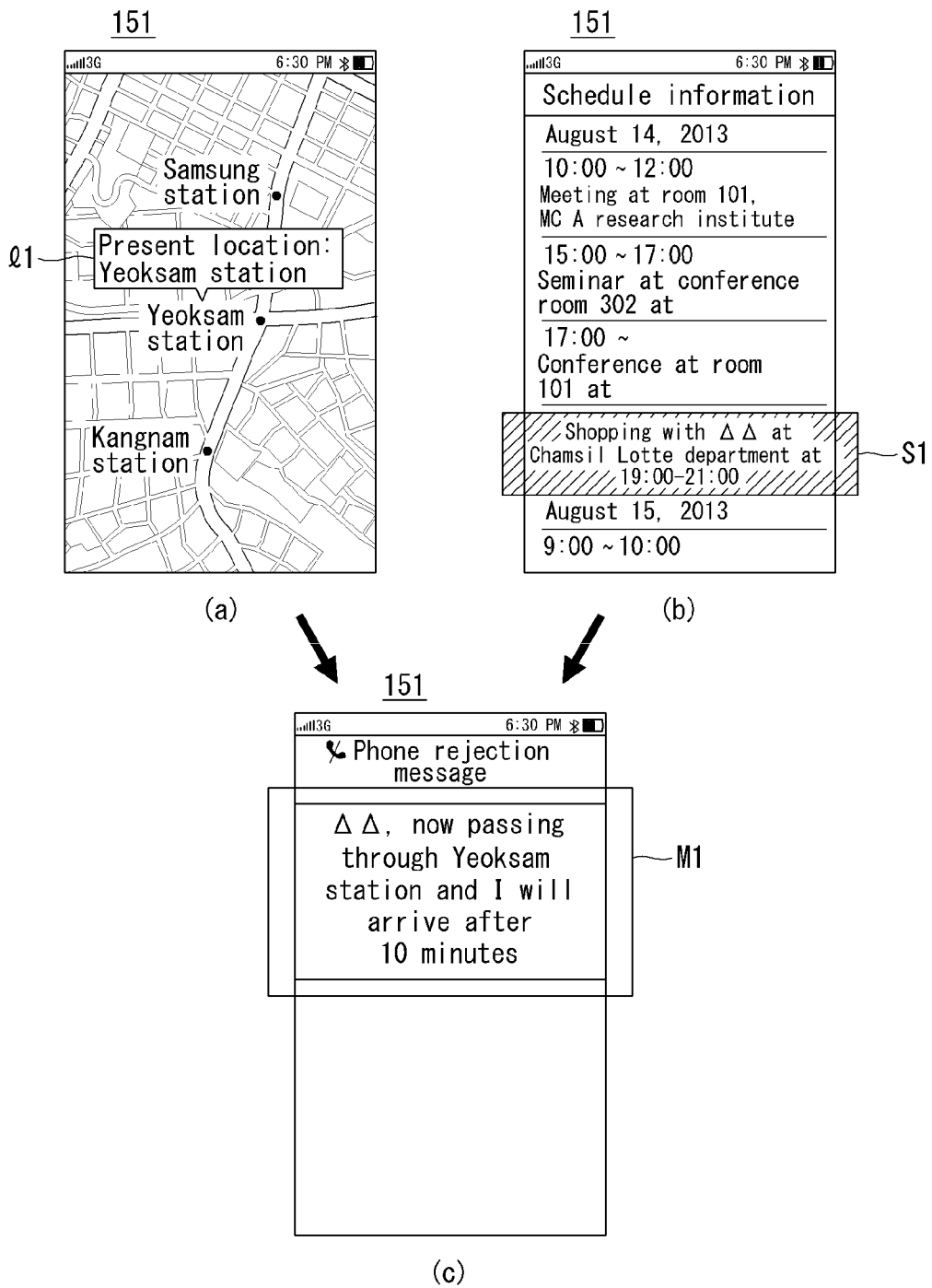

Referring to FIG. 17, the controller 180 may generate a message M1 (c) including user context information using location information 11 (a) of a terminal measured when call reception is terminated and stored schedule information (S1) of the user. For example, if a call reception request from ΔΔ

(e.g., another party) received at 6:29 PM satisfies a preset condition, the controller 180 may terminate the call reception at 6:30 PM and generate a phone rejection message including user context information.

The controller 180 may acquire location information (l1) of the terminal at 06:30 PM as 'Yeoksam station' through the location information module 115. Further, the controller 180 may acquire location change information (from Kangnam station to Yeoksam station) as well as present location information (l1) through the location information module 115.

The controller 180 may select 'Conference at room 101 at 17:00~' and 'Shopping with ΔΔ at Chamsil Lotte department at 19:00-21:00' (S1), which are schedules before and after 06:30 PM from the user schedule information stored at the memory 160.

The controller 180 may select 'shopping with ΔΔ at Chamsil Lotte department at 19:00-21:00' in the user' schedule information from 'move from Kangnam station to Yeoksam station' and 'Yeoksam station at present', which are location information l1 of the terminal measured at 06:30 PM as information to use upon generating user context information. That is, when call reception is terminated, location information of the terminal is unrelated to a previous schedule and thus the controller 180 may select a schedule after a call reception termination time point.

The controller 180 may generate "ΔΔ, Yeoksam station at 6:30 PM" as user context information using 'move from Kangnam station to Yeoksam station' and 'Yeoksam station at present', which are location information l1 of the terminal, and 'shopping with ΔΔ at Chamsil Lotte department at 19:00-21:00', which are selected schedule information of the user.

The controller 180 may adjust the generated user context information additionally using sender information (level, name, honorific title, group, etc.) stored at the address book, a user's character input pattern, a sender, and a communication history.

Specifically, the controller 180 may select a postpositional word for ΔΔ name using sender information and a communication history, determine whether to use a honorific title, and convert an absolute time '6:30 PM' to a relative time 'now' using the user's character input pattern and a communication history. In addition, the controller 180 may adjust 'Yeoksam station' to 'passing through Yeoksam station' using present location information of the terminal and add an estimated time of arrival information as user schedule information using location information included in present location information and schedule information.

The controller 180 may adjust "ΔΔ, Yeoksam station at 6:30 PM" to "ΔΔ, now passing through Yeoksam station and I will be arrived after 10 minutes" using the sentence conversion rule.

Figure 18:
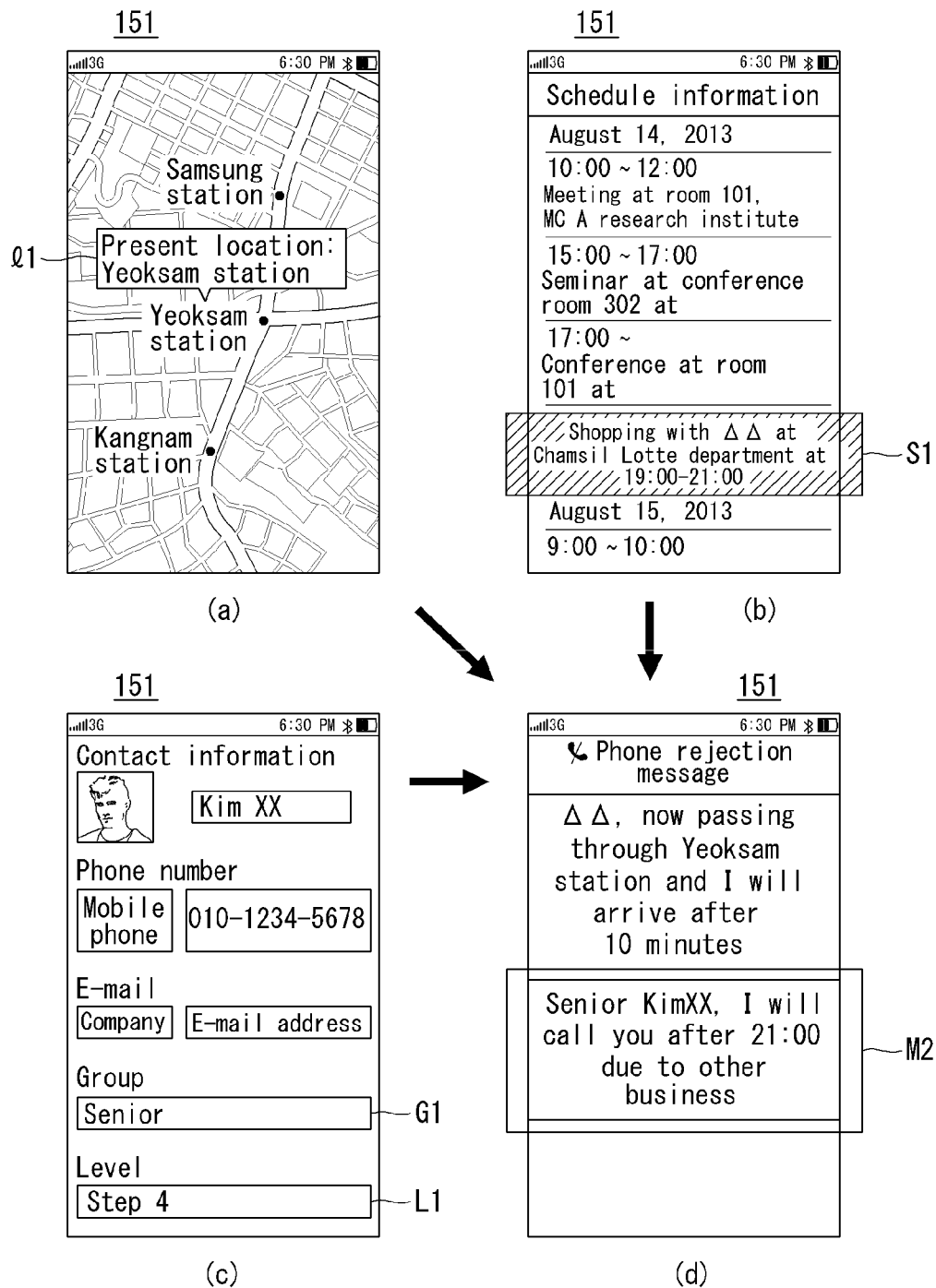

Referring to FIG. 18, the controller 180 may generate a message M2 (d) including user context information using location information l1 of the terminal measured when call reception is terminated (a), stored schedule information S1 of the user (b), and sender information (c).

For example, if a call reception request from ΔΔ received at 6:29 PM satisfies a preset condition, the controller 180 may terminate call reception at 6:30 PM and generate a phone rejection message including user context information. When generating an initial user's context information, the controller 180 may use sender information.

A method of acquiring location information l1 of the terminal and selection of stored schedule information of a user when call reception is terminated have been described in the foregoing description and therefore a method of using sender information when generating the user's context information will be additionally described.

The controller 180 may limit a specific content of user context information according to a sender's level when generating the user's context information using the sender's name 'KIM XX', a group 'senior', and a level 'step 4', which is sender information of XX. For example, when the sender's level is set lower than 3, the controller 180 may limit a schedule content and location information of the user's schedule information not to be included in user context information.

Because XX's level is set to step 4, the controller 180 may generate "senior XX, a phone call after 21:00 due to another business" as user context information. The controller 180 may adjust the generated user context information by additionally using the user's character input pattern, a sender, and a communication history.

Specifically, the controller 180 may adjust 'senior XX' to 'senior KIMXX' and 'phone call' to 'I will call you" using a sender and a communication history. The controller 180 may adjust "senior XX, a phone call after 21:00 due to another business" to "senior XX, I will call you after 21:00 due to another business" using the sentence conversion rule.

Therefore, when generating user context information with reference to address book information, the controller 180 may limit a specific content included in user context information according to a sender's level or may not transmit a phone rejection message including user context information and thus this is different from using address book information upon adjusting user context information.

Referring to FIG. 19, the controller 180 may generate user context information (e) using measured location information l1 (a) of the terminal when call reception is terminated, stored schedule information S1 (b) of the user, sender information (c), and a sender transmitted and received message history (d).

That is, the controller 180 may generate user context information with reference to a sender and transmitted and received message history. For example, if a call reception request received at 6:29 PM from Kim 00 satisfies a preset condition, the controller 180 may terminate call reception at 6:30 PM and generate a phone rejection message including user context information.

When generating an initial user's context information, the controller 180 may change a synonym to a frequently using word using the sender and transmitted and received history, determine a literary type and honorific title selection, and generate initial user context information.

The controller 180 may change a sender's name from 'KIM OO' to 'sister OO' using a message history of OO, use a literary type of a dialogue type, and generate initial user context information not to use a honorific title. Further, because a sender level is step 3, the controller 180 may limit information about a business cooperation performer of user context information using address book information.

That is, the controller 180 may generate user context information of "sister OO, shopping at 19:00-21:00". The controller 180 may adjust the generated user context information by additionally using the user's character input pattern. Specifically, if the user's character input pattern is used together with a word representing uncertainty, the controller 180 may adjust user context information to "sister OO, shopping is scheduled at 19:00-21:00"

Figure 20:
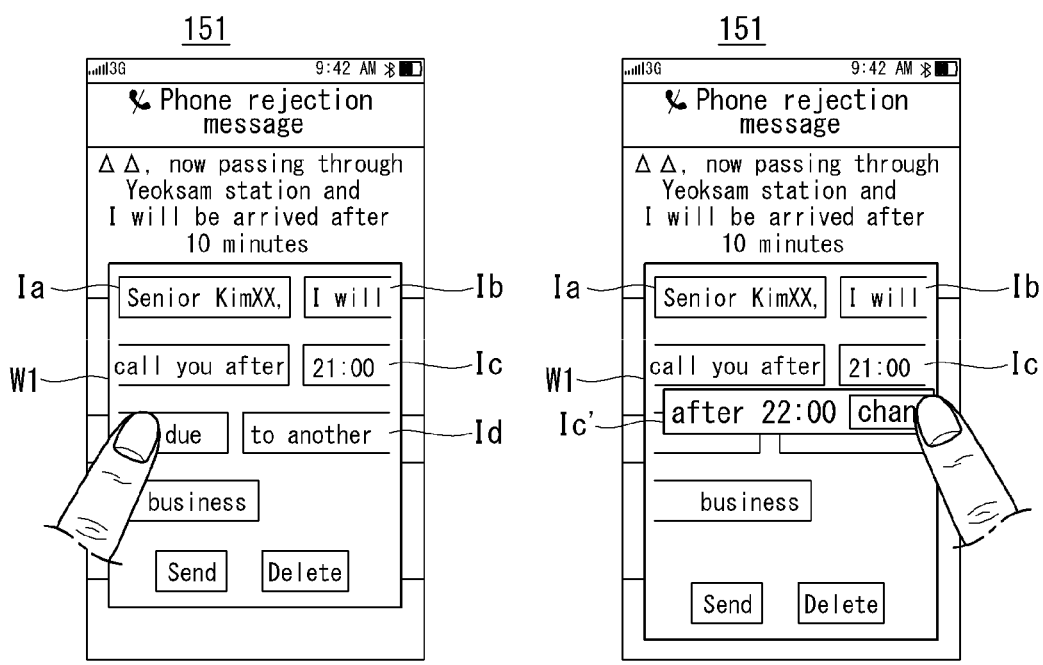

Referring to FIG. 20, the controller 180 displays a pop-up window W1 that requests the user's check before transmitting a phone rejection message on the touch screen 151. When the controller 180 performs displays Ia, Ib, Ic, and Id that can edit user context information included in the phone rejection message on each word-phrase basis, and receives an selection input of a specific word-phrase Ic, the controller 180 may provide an editing screen Ic'.

When the controller 180 receives a touch input of the editing screen Ic', the controller 180 controls to display a cursor on the editing screen Ic' and to additionally display a keypad. When 'transmit' of a check notification window W1 of the phone rejection message is touched, the controller 180 transmits the phone rejection message to another party, and when 'delete' is touched, the controller 180 may delete the phone rejection message.

The controller 180 may previously set whether to display a check notification window of a phone rejection message, and when a check notification window display is set, the controller 180 may perform the user's check process by displaying a check notification window before transmitting a phone rejection message.

When it is set not to display the check notification window of the phone rejection message, if a phone rejection message including user context information is generated, the controller 180 may immediately transmit a phone rejection message to another party.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A mobile terminal, comprising:
a wireless communication unit configured to perform wireless communication; and
a controller configured to:
receive an incoming call from another terminal through the wireless communication unit,
receive an input of a user action, when receiving the incoming call through the wireless communication unit,
measure location information of the mobile terminal, if the input of the user action satisfies a preset condition,
generate user context information using the measured location information of the mobile terminal and stored user schedule information, and
transmit a phone rejection message including the user context information to the other terminal.

2. The mobile terminal of claim 1, wherein the controller is further configured to determine that the input of the user action satisfies the preset condition, when receiving at least one input that terminates the incoming call, releases notification of the incoming call, inclines the mobile terminal, shakes the mobile terminal, turns over the mobile terminal, and proximity hovers over the mobile terminal.

3. The mobile terminal of claim 2, further comprising a sensing unit including a posture detection sensor configured to detect a posture change of the mobile terminal and a proximity sensor configured to detect whether the user approaches the mobile terminal,
wherein the controller is further configured to identify the input of the user action using an angle change or a motion change of the mobile terminal detected through the posture detection sensor and a proximity pattern change detected through the proximity sensor.

4. The mobile terminal of claim 1, further comprising a memory,
wherein the controller is further configured to extract the user schedule information including a date and a time from at least one of a message stored at the mobile terminal, a transmitted message or a received message, an e-mail, a memo, and a schedule registered at an applied application, and to align and store the user schedule information in date and time order in the memory, and to periodically delete the user schedule information of a previous time point from the memory.

5. The mobile terminal of claim 1, wherein the controller is further configured to determine contents included in the user context information according to the input of the user action.

6. The mobile terminal of claim 1, wherein the controller is further configured to determine a level of a sender of the other terminal using address book information and to determine contents included in the user context information according to the level of the sender.

7. The mobile terminal of claim 6, wherein the controller is further configured to set a level of contact information stored in the address book information using group information of the address book or a communication history and to store the level of contact information as the address book information or to set a level input by the user as the address book information.

8. The mobile terminal of claim 1, wherein the controller is further configured to generate the user context information based on the stored user schedule information, if location information included in the user schedule information corresponds with the measured location information of the mobile terminal and generates the user context information based on the measured location information of the mobile terminal, if location information included in the user schedule information does not correspond with the measured location information of the mobile terminal, when location information is included in the stored user schedule information.

9. The mobile terminal of claim 1, wherein the controller is further configured to couple the measured location information of the mobile terminal, stored user schedule information, and location information of a sender and generate the user context information, when the location information of a sender of the other terminal is received.

10. The mobile terminal of claim 1, wherein the controller is further configured display a pop-up window configured to determine whether the user context information and the phone rejection message are transmitted to the other terminal and to transmit the phone rejection message, when an input requesting transmission of the phone rejection message is received.

11. The mobile terminal of claim 10, wherein the controller is further configured to display at least one indicator that can edit the user context information based on a type of contents and to overlap and display an editing screen of a corresponding content with the content, when an input of the at least one indicator is received.

12. The mobile terminal of claim 1, wherein the controller is further configured to generate the user context information including at least one of a sender's name, time information, location information, and a schedule content extracted from the stored user schedule information and the measured location information of the mobile terminal in contents.

13. The mobile terminal of claim 12, wherein the controller is further configured to generate a sentence conversion rule using at least one of a pattern in which a user inputs a character, a sender of the other terminal, a communication history, and address book information and to adjust the generated user context information according to the sentence conversion rule.

14. The mobile terminal of claim 13, wherein the sentence conversion rule includes at least one of a conversion rule of a word, a selection rule of an postpositional word, a selection rule of a literary type, and a selection rule of formality,
wherein the controller is further configured to determine a priority of synonym selection and postpositional word selection using a pattern in which the user inputs a character, a sender, or a communication history and to determine a conversion rule of the word or a selection rule of an postpositional word according to the priority, and
wherein the controller is further configured to determine a priority of literary type selection and selection of a honorific title using the sender, the communication history, or the address book information, to determine a selection rule of the literary type according to the priority, and to determine a selection rule of formality according to whether selection of a honorific title.

15. The mobile terminal of claim 14, wherein the controller is further configured to set an intimacy level with the sender according to a frequency of the communication history and to readjust the adjusted user context information according to the intimacy level.

16. A mobile terminal, comprising:
a wireless communication unit configured to perform wireless communication;
a display unit; and
a controller configured to:
receive an input for terminating an incoming call through the display unit,
measure location information of the mobile terminal, if another party of the incoming call satisfies a preset condition,
generate user context information using the measured location information of the mobile terminal and stored user schedule information, and
transmit a phone rejection message including the context information of the user.

17. The mobile terminal of claim 16, wherein the controller is further configured to identify a level of the other party of the incoming call using address book information and to determine contents included in the user context information according to the level.

18. A method of controlling a mobile terminal, the method comprising:
receiving, via a wireless communication unit, an incoming call from another terminal through the wireless communication unit;
receiving, via a controller, an input of a user action, when receiving the incoming call through the wireless communication unit;
measuring, via the controller, location information of the mobile terminal, if the input of the user action satisfies a preset condition;
generating, via the controller, user context information using the measured location information of the mobile terminal and stored user schedule information; and
transmitting, via the wireless communication unit, a phone rejection message including the user context information to the other terminal.

19. The method of claim 18, further comprising:
determining that the input of the user action satisfies the preset condition, when receiving at least one input that terminates the incoming call, releases notification of the incoming call, inclines the mobile terminal, shakes the mobile terminal, turns over the mobile terminal, and proximity hovers over the mobile terminal.

20. The mobile terminal of claim 19, further comprising:
detecting, via a sensing unit, a posture change of the mobile terminal and whether the user approaches the mobile terminal; and
identifying the input of the user action using an angle change or a motion change of the mobile terminal detected through the posture detection sensor and a proximity pattern change detected through the proximity sensor.

* * * * *